Feb. 24, 1959 P. B. EDWARDS 2,874,964
DECORATIVE HOLLOW PLAY BALLS
Filed July 9, 1957
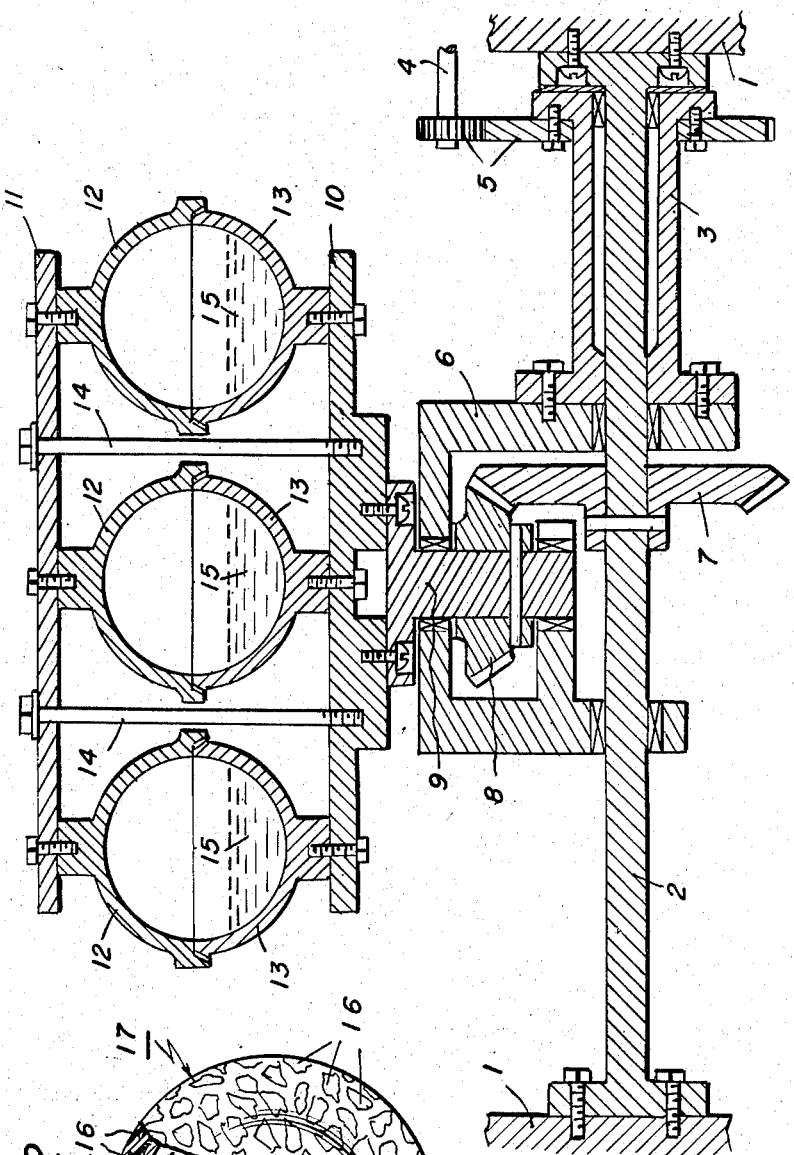
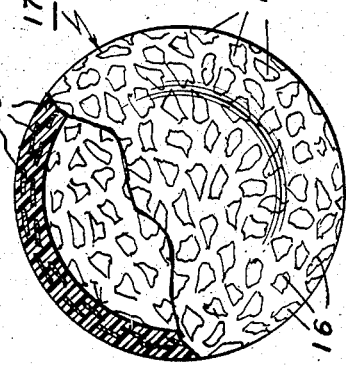
Inventor
PHILIP B. EDWARDS
By James M. Graves
Attorney

United States Patent Office 2,874,964
Patented Feb. 24, 1959

2,874,964
DECORATIVE HOLLOW PLAY BALLS

Philip B. Edwards, Berryville, Va., assignor to Bayshore Industries, Inc., Elkton, Md., a corporation of Maryland Application July 9, 1957, Serial No. 670,831

3 Claims. (Cl. 273—58)

This invention relates to the production of decorative hollow objects and is more particularly concerned with the production of decorative, hollow, elastic playballs, the walls of which are crystal clear and transparent but which have embedded therein, below the outer surface thereof, highly decorative, multi-colored particles heterogeneously distributed in random fashion.

It is an object of the invention to produce a decorative, hollow, elastic playball of this character wherein the body of the ball is composed of clear, transparent polymeric material having embedded therein variously shaped and colored particles of elastic polymeric material of essentially the same basic polymeric material forming the body of the ball, thereby retaining the elastic qualities of the ball.

Another object is to produce a playball of the foregoing nature wherein the variously shaped and colored decorative particles which are heterogeneously scattered throughout the clear and transparent ball body are composed of cuttings from sheets of variously colored elastic polymeric material produced by chopping said sheets into small irregular shapes or specific designs.

Other objects will become apparent as the description proceeds.

In accordance with the invention, the body of the playball is cast from a plastisol comprising basically an elastic polymeric material such as a thermoplastic synthetic resin compounded with plasticizers, stabilizers and extenders. The material preferably comprises a polymer or co-polymer of the vinyl type such as vinyl chloride, vinyl acetate, vinylidene chloride, vinyl chloride-vinylidene chloride, co-polymer of vinyl chloride with vinyl acetate (Vinylite resin VYNV.2—Bakelite Corp.) and the like to which has been added suitable plasticizers, stabilizers and extenders. While the vinyl type resin is preferred it will be understood, of course, that other thermoplastic synthetic resins having the desired degree of clarity and elasticity may be employed, such as methyl methacrylate, polystyrene and the like.

As plasticizers for the resin there may be employed any of the common natural plasticizers such as abietic acid esters, castor oil, tung oil, linseed oil and soybean oil or any of the common esters such as dimethyl phthalate, dibutyl phthalate, dioctyl phthalate, di-(2-ethyl hexyl) phthalate, butyl benzyl phthalate, dicapryl phthalate and various mixed phthalates, butyl stearate and related esters, dibutyl sebacate, didecyl adipate, di-(2-ethyl hexyl) adipate, dioctyl sebacate, methyl glycolate, tri-(2-ethyl hexyl) phosphate and tricresyl phosphate. Proprietary plasticizers found useful are Flexol plasticizer DOP, Dinopol, Flexol plasticizer TOF, Flexol plasticizer 8N8, Kronisol, Santicizer B-16, Paraplex G-25, Abalyn, Baker's P-4, Dutrex No. 20, Dutrex No. 25 and Flexol plasticizer 4GO.

As stabilizers and extenders there may be employed, barium-cadmium soap stabilizer, organic tin and organic cadmium stabilizers, cadmium octoate, stabilizer A-5, stabilizer C-2, stabilizer G-18 Victor, stabilizers 53 and 85 and epoxy resin stabilizers.

The following formulations have been found useful in the casting of the body of the clear ball:

|  | Parts |
|---|---|
| Octyl decyl phthalate | 80 |
| Di decyl adipate | 20 |
| Tricresyl phosphate | 6 |
| Polyvinyl chloride resin | 100 |
| Barium-cadmium soap type stabilizer | 3 |
| Organic cadmium stabilizer | 1 |
| Butyl benzyl phthalate | 50 |
| Tri-(2-ethyl hexyl) phosphate | 44 |
| Polyvinyl chloride resin | 100 |
| Epoxy type heat stabilizer | 1 |
| Organic tin stabilizer | 3 |
| Organic cadmium stabilizer | ½ |
| Octyl decyl phthalate | 50 |
| Di-(2-ethyl hexyl) adipate | 46 |
| Polyvinyl chloride resin | 100 |
| Organic tin stabilizer w/chelating agent | 3 |

The foregoing formulations give clear, transparent, colorless ball bodies. However, if desired, they may be tinted by the inclusion of an organic dyestuff.

As already indicated hereinbefore the resin formulation making up the sheet stock which is chopped up to provide color spots in the clear balls is the same basic formulation as that employed for the casting of the body of the ball except that coloring pigments are added as well as fillers. Among the pigments found suitable are: "Mapico" iron brown No. 420, "Mapico" lemon yellow, "Mapico" black, "Mapico" brown No. 418, "Titanox" A-168 LO, chrome green, medium, fast violet, lampblack, oiled carbon black, basic silicate white lead, basic sulfate white lead, blue basic lead sulfate, basic lead carbonate, "Asbestine" 3X, and "Metro-Nite BXXXX." As fillers found suitable are Atomite, Kalite, Silene, etc., although it will be understood that many of the foregoing coloring pigments are in and of themselves fillers also.

A typical vinyl formulation for the sheet stock which is chopped up to provide the color particles in the clear balls is the following:

|  | Parts |
|---|---|
| Polyvinyl chloride | 100 |
| Di-(2-ethyl hexyl) phthalate | 17.5 |
| Alkyl aryl phosphate | 17.5 |
| Di-(2-ethyl hexyl) adipate | 15 |
| Silene | 15 |
| Chrome green | 1 |
| Calcium stearate (lubricant) | .4 |
| Dibasic lead stearate stabilizer | .5 |
| Basic silicate white lead stabilizer | 1.5 |
| Cadmium octoate stabilizer | 1.5 |

Also contemplated for use in the practice of the invention are printed vinyl sheet cut-outs.

The process for forming the decorative playballs of the present invention is one which is generally referred to as a roto-cast process and is carried out in an apparatus shown in the accompanying drawings in which Fig. 1 is a section of said apparatus and Fig. 2 is a view of the novel decorative ball, partly cut away and partly shown in section.

In the drawings, and referring particularly to Fig. 1 thereof, the numeral 1 designates the walls of an oven or the like in which the casting process takes place. Bridging the walls of the oven is a stationary support shaft 2. Concentric with said support shaft is a rotating shaft 3 which is driven from a source of power, not shown, through driving shaft 4 and drive gears 5. Rotating shaft 3 is affixed to rotating gear cage 6. Fixed to the stationary support shaft 2 is a stationary bevel gear 7 which is meshed with rotating bevel gear 8 carried on rotating shaft 9. Shaft 9 carries lower mold plate 10 and upper mold plate 11. Between mold plates 10 and 11 are mounted separate semispherical mold halves 12 and 13. The mold halves are releasably held together by clamping screws 14. Thus, it will be seen that when power is applied to driving shaft 4, gear cage 6 and the mold halves will revolve in a vertical plane while the mold halves will also revolve simultaneously in a relatively horizontal plane. Thus, a compound or multiple casting action is achieved.

In the preferred apparatus, a quick disconnect is provided between the gear cage 6 and the mold plates 10 and 11, so that the gear cage remains in the oven, the mold plates being taken off for filling, cooling and stripping. In other words, the molds and mold plates are placed on the gear cage only during the heating cycle. In an alternate arrangement, the gear cage would be mounted on a transporting device which could carry the molds from a filling area to the heating and rotating area, then to the cooling area, and finally to the stripping area.

In accordance with the preferred process of the present invention, a measured amount of a clear liquid vinyl plastisol 15 of the foregoing character and containing cut vinyl chips is placed in the lower halves of the molds. The charge is less in volume, of course, than the volume of the mold and its weight constitutes the final weight of the ball to be cast. It should be pointed out that the mold employed has a non-porous inner surface. The molds are then clamped closed between plates 10 and 11, mounted on gear cage 6 and then rotated through a multiplicity of planes for a short period of time at room temperature or slightly higher (60° F. to 100° F.) to distribute the charge as a layer over the entire surface of the mold cavity. Steam, hot air or other heating media is allowed to enter the oven and the layer in the mold is gelled against the inner surface of the mold while the mold is rotating. This part of the process is carried out at a temperature of approximately 110° F. to 200° F. At this temperature gelling occurs. After a few minutes additional heat is applied to the closed mold to raise the temperature thereof sufficiently to fuse the gelled layer against the inner surface of the mold. Fusing temperature is generally within the range of 340° F. to 400° F., although oven temperatures may go as high as 600° F., depending upon the particular formulation employed. The mold is then cooled until the temperature of the layer is below the fusing point of the material, between room temperature and 110° F., and after cooling the mold is opened and the ball removed.

For producing a transparent ball with colored chips, figures, or other decorative objects, an unfilled, unpigmented plastisol is mixed with from 2% to 10% by weight of properly cut pieces of flexible or rigid vinyl sheeting before charging the mold. When the mold is rotated the clear plastisol and colored cuttings distribute themselves in a fairly even manner over the mold interior.

In an alternative method, the clear plastisol is placed in the open mold and a predetermined amount of cuttings is simply placed in the mold on top of the plastisol. During rotation, the cuttings and plastisol become deposited in a fairly even manner over the mold interior.

In a still further alternative method, the colored vinyl sheet cuttings may be simply placed by hand on the inner surfaces of the mold, employing, if desired, the plastisol as an adhesive agent. Thus, the chips or cuttings may be dipped in plastisol and simply placed by hand against the inner surfaces of the mold.

In Fig. 2 is depicted the novel decorative playball of the invention manufactured in accordance with the above-described process. As shown, the walls 16 of the ball are clear and transparent and have embedded therein, just below the outer surface thereof, a multiplicity of highly decorative, multi-colored particles 17 of various shapes, sizes and designs heterogeneously distributed and scattered in random fashion, said particles, as clearly shown in Fig. 2, being present in number sufficient to provide scattered color spots but insufficient substantially to affect the clarity and transparency of the walls, thus providing a pleasing double visual effect when viewed through the ball inasmuch as particles in the rear wall as well as those in the front wall of the ball are visible to the eye.

While the above-described process is particularly adapted for the production of playballs of the type set forth, it is obvious that the objects of the invention could be achieved in the production of other articles such as toys, squeeze bulbs and bottle-shaped objects for containing and dispensing various liquids and pastes.

It is apparent that, within the scope of the present invention, various modifications and different arrangements may be made other than those specifically disclosed herein, that the present disclosure is merely illustrative, and that the invention comprehends such additional equivalent modifications and arrangements.

This application is a continuation-in-part of application Serial No. 521,347 filed July 11, 1955 and since abandoned.

What is claimed is:

1. A decorative, elastic, hollow playball the walls of which are composed of clear and transparent polyvinyl plastic having imbededd therein, below the outer surface thereof, highly decorative, multi-colored chips of vinyl plastic sheeting heterogeneously distributed in random fashion throughout the walls, said chips being present in number sufficient to provide scattered color spots but insufficient substantially to affect the clarity and transparency of the walls, thus providing a pleasing double visual effect when viewed through the ball inasmuch as chips in the rear wall as well as those in the front wall of the ball are visible to the eye.

2. A decorative, elastic, hollow playball the walls of which are composed of clear and transparent polyvinyl plastic having imbedded therein, below the outer surface thereof, highly decorative, multi-colored, variously shaped chips of vinyl plastic sheeting heterogeneously distributed in random fashion throughout the walls, said chips being present in number sufficient to provide scattered color spots but insufficient substantially to affect the clarity and transparency of the walls, thus providing a pleasing double visual effect when viewed through the ball inasmuch as chips in the rear wall as well as those in the front wall of the ball are visible to the eye.

3. A decorative, elastic, hollow playball the walls of which are composed of clear and transparent polyvinyl plastic having imbedded therein, below the outer surface thereof, highly decorative, multi-colored chips of vinyl plastic sheeting of specific design heterogeneously distributed in random fashion throughout the walls, said chips being present in number sufficient to provide scattered color spots but insufficient substantially to affect the clarity and transparency of the walls, thus providing a pleasing double visual effect when viewed through the ball inasmuch as chips in the rear wall as well as those in the front wall of the ball are visible to the eye.

References Cited in the file of this patent

UNITED STATES PATENTS

| | | |
|---|---|---|
| 1,542,005 | Riley | June 16, 1925 |
| 2,035,774 | Trobridge et al. | Mar. 31, 1936 |
| 2,060,962 | Twiss et al. | Nov. 17, 1936 |
| 2,324,277 | Casey et al. | July 13, 1943 |
| 2,473,722 | Nelson | June 21, 1949 |